Aug. 29, 1950     J. H. STARR     2,520,345
POWER LIFT FOR GRAIN DRILLS
Filed March 30, 1944     8 Sheets-Sheet 1
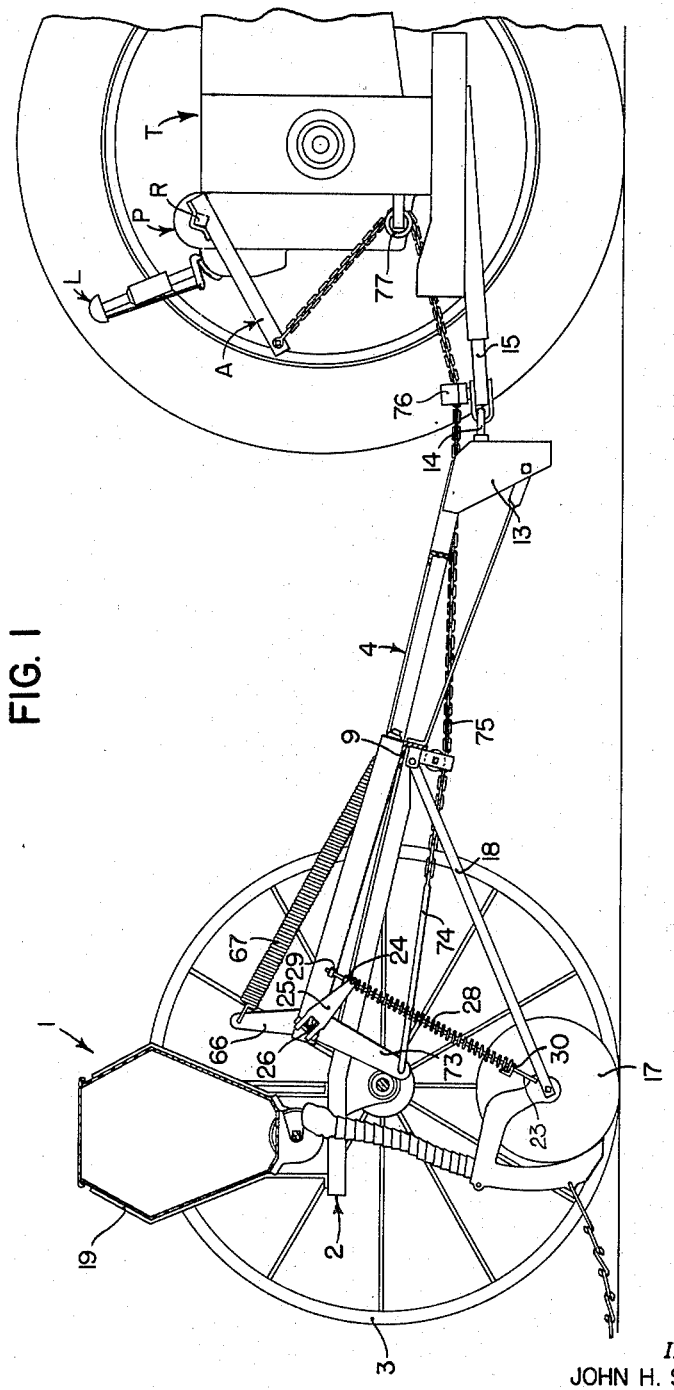
FIG. I
*INVENTOR.*
JOHN H. STARR
ATTORNEYS Aug. 29, 1950  J. H. STARR  2,520,345
POWER LIFT FOR GRAIN DRILLS
Filed March 30, 1944  8 Sheets-Sheet 2
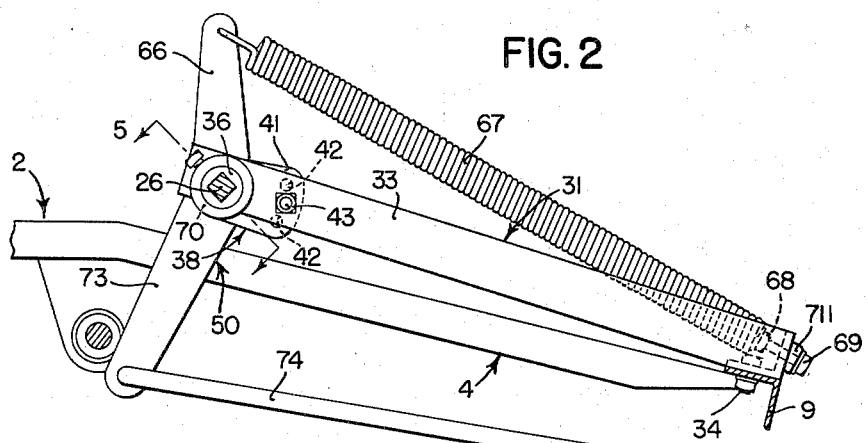//FIG. 2
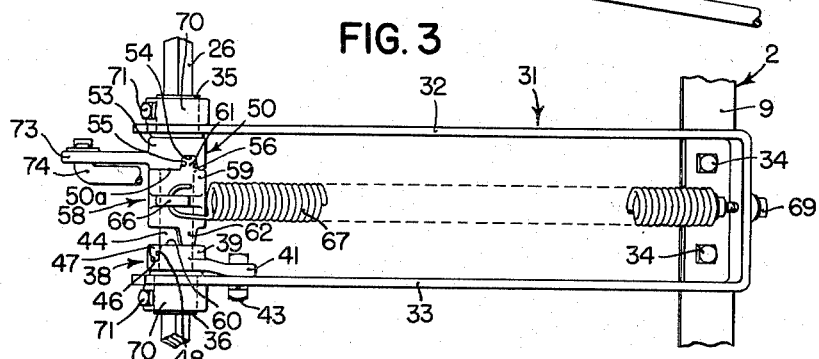//FIG. 3
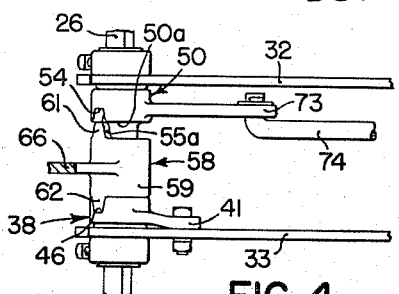//FIG. 4
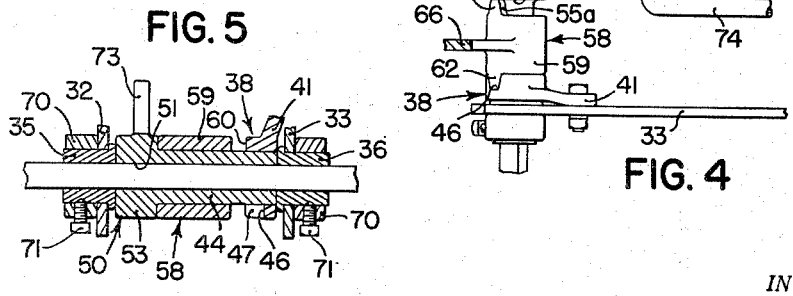//FIG. 5
INVENTOR.
JOHN H. STARR
ATTORNEYS

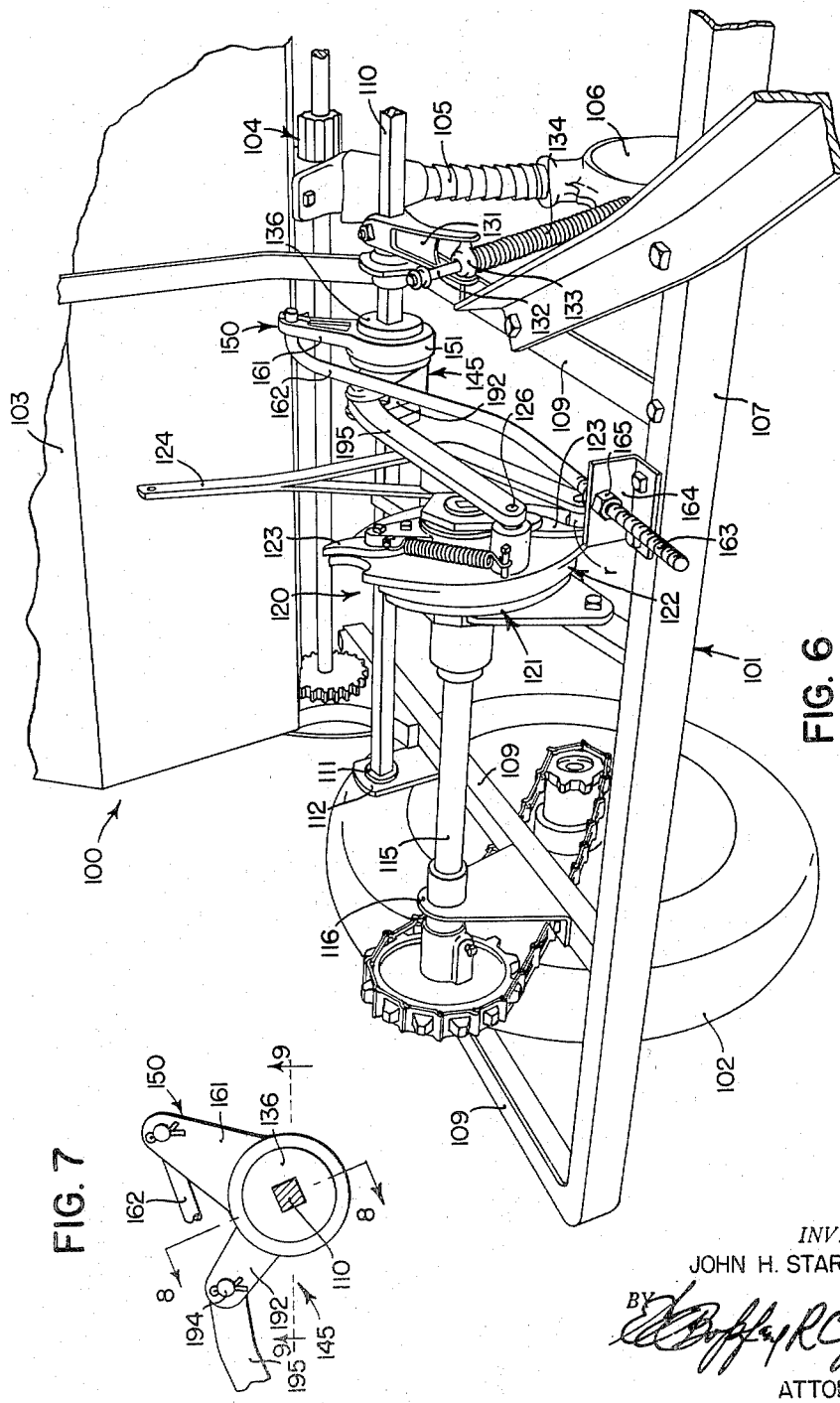

Aug. 29, 1950     J. H. STARR     2,520,345
POWER LIFT FOR GRAIN DRILLS
Filed March 30, 1944     8 Sheets-Sheet 4

INVENTOR.
JOHN H. STARR
ATTORNEYS

Aug. 29, 1950     J. H. STARR     2,520,345
POWER LIFT FOR GRAIN DRILLS
Filed March 30, 1944     8 Sheets-Sheet 5

*INVENTOR.*
JOHN H. STARR
BY
ATTORNEYS

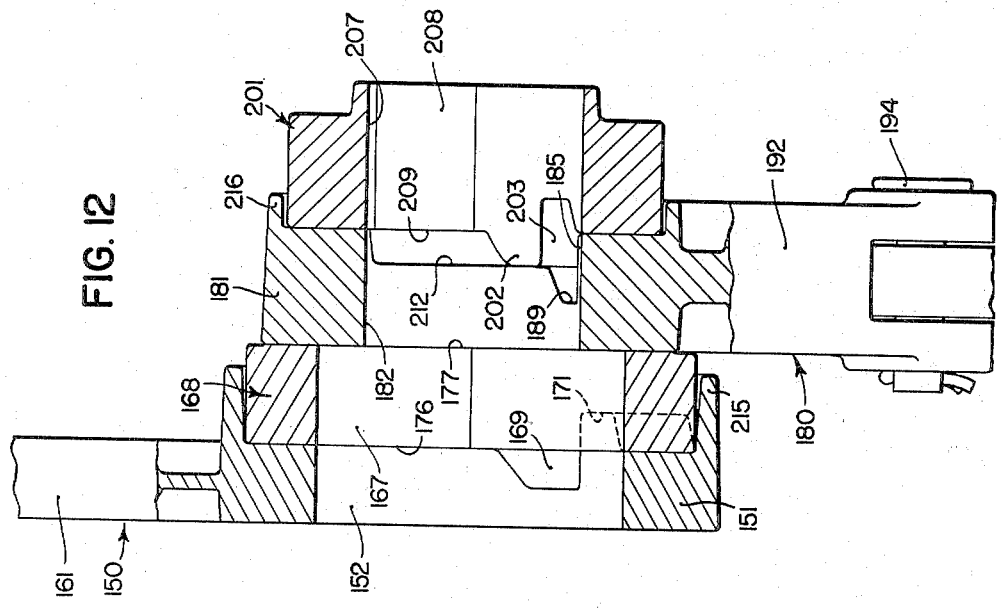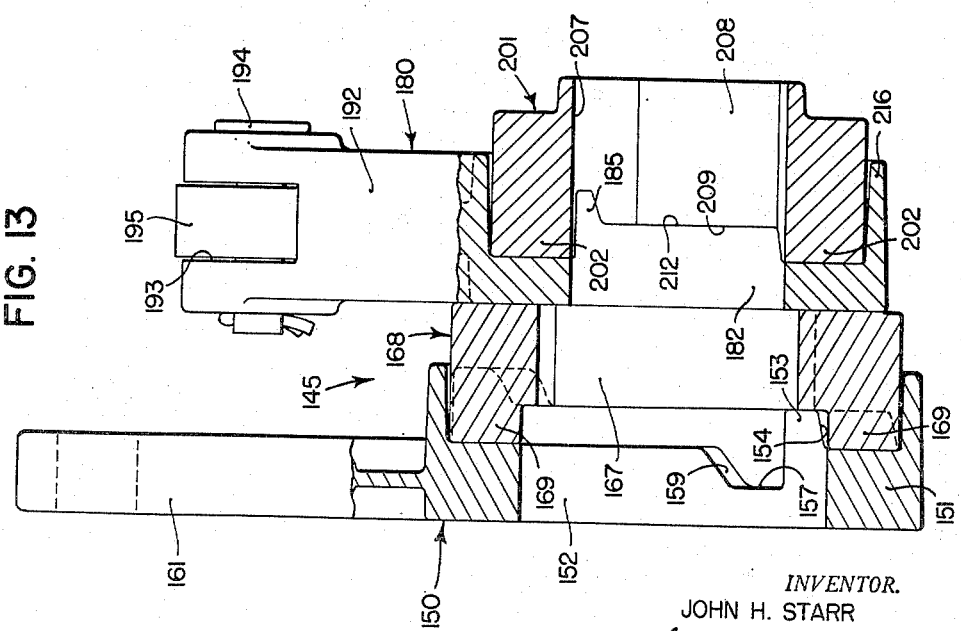

Aug. 29, 1950  J. H. STARR  2,520,345
POWER LIFT FOR GRAIN DRILLS
Filed March 30, 1944  8 Sheets-Sheet 7
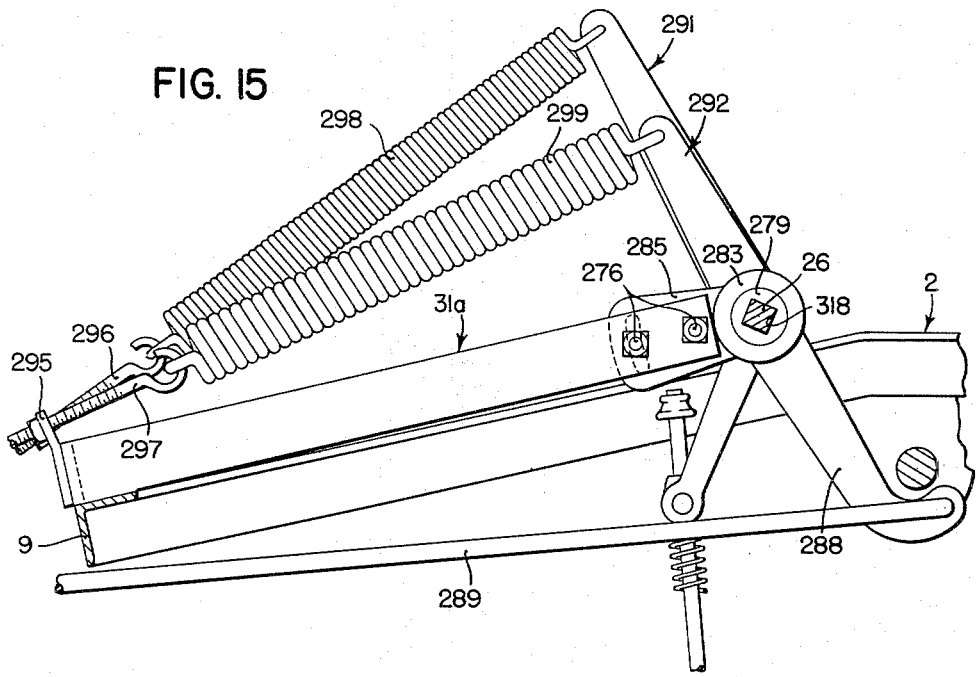
FIG. 15
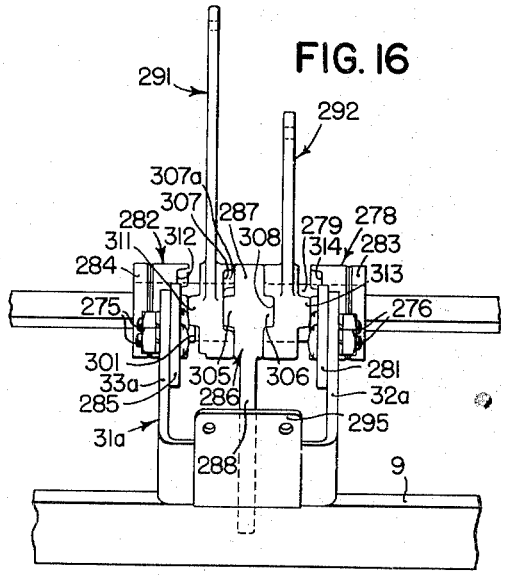
FIG. 16
INVENTOR.
JOHN H. STARR
ATTORNEYS Aug. 29, 1950  J. H. STARR  2,520,345
POWER LIFT FOR GRAIN DRILLS
Filed March 30, 1944  8 Sheets-Sheet 8

*INVENTOR.*
JOHN H. STARR
BY
ATTORNEYS

Patented Aug. 29, 1950

2,520,345

UNITED STATES PATENT OFFICE 2,520,345

POWER LIFT FOR GRAIN DRILLS

John H. Starr, Mayville, Wis., assignor to John Deere Van Brunt Company, a corporation of Wisconsin Application March 30, 1944, Serial No. 528,794

29 Claims. (Cl. 97—244)

The present invention relates generally to agricultural machines and more particularly to those having one or more earth working tools adapted to be raised and lowered into and out of transport and operating positions.

More particularly, the present invention is especially concerned with agricultural implements in which it is frequently necessary or desirable to apply a generally downwardly directed force against the tool or tools for holding them in the ground.

The object and general nature of the present invention is the provision of new and improved means for applying force for holding a tool or tools in the ground. More particularly, it is a feature of this invention to provide means for holding a tool or tools in the ground, in conjunction with raising and/or lowering mechanism in which such mechanism is relieved of the strain of holding the tool or tools in the ground when in operating position.

More specifically, it is a feature of this invention to provide a tool lifting and/or lowering arrangement in which substantially the entire weight of the machine is available for holding the tool or tools in the ground, in conjunction with interlocking means cooperating with the frame of the implement for relieving the raising and/or lowering mechanism of the strain of holding the tool or tools in the ground. In one form of the invention, means is provided for connecting a loading spring with the tool or tools so as to hold them in the ground, with interlocking means effective to transfer the tension of the loading spring to the implement frame when the tools are raised, thereby relieving the raising mechanism of the stresses that would be involved in raising the tool or tools against the action of the loading spring throughout the range of movement into the transport or fully raised position of the tool or tools. In another form of the present invention, adapted especially to operate with a power lifting unit of the type that is power driven in both directions, that is, both in the lifting direction and in the lowering direction, wherein suitable interlocking means is provided for locking the tool or tools to the frame when the tool or tools have been moved into their lowered position, and thereafter releasing the raising and/or lowering mechanism from connection with the tool or tools. In a third form of the invention, means is provided for utilizing a plurality of springs for forcing the tools into the ground and progressively applying the force of said springs to the tool or tools and likewise progressively releasing the springs from the tool or tools when raising them, whereby the raising mechanism is not required to raise the tools through their entire range of raising movement against the action of said springs.

These and other objects and advantages of the present invention will be apparent to those skilled in the art after a consideration of the following detailed description, taken in conjunction with the accompanying drawings in which the preferred embodiments of the present invention have been illustrated.

In the drawings:

Figure 1 is a side view, with certain parts shown in section, of a tractor drawn grain drill in which the principles of the present invention have been incorporated.

Figure 2 is an enlarged fragmentary side view of the raising and lowering mechanism of the grain drill shown in Figure 1, the parts being shown in the positions they occupy when the tools are lowered into their operating or soil working position.

Figure 3 is a plan view of the mechanism shown in Figure 2.

Figure 4 is a fragmentary view similar to Figure 3, but showing the raised positions of the parts, with the loading spring anchored to the frame.

Figure 5 is a section taken generally along the line 5—5 of Figure 2.

Figure 6 is a fragmentary perspective view of a modified form of the present invention, particularly adapted for a power lift unit of the double acting type.

Figure 7 is a fragmentary side view of the connecting unit between the power lift link and the pressure shaft of the grain drill.

Figure 8 is a view taken generally along the line 8—8 of Figure 7 showing the parts in the positions they occupy, as in Figure 6, when the tools are lowered and interlocked with the stationary member but released from the power lift actuated member.

Figure 9 is a section taken along the line 9—9 of Figure 7, but with the parts in the positions they occupy when the tools are raised.

Figure 10 is a perspective view of the shaft-carried bushing upon which the parts shown in Figures 8 and 9 are mounted.

Figure 11:
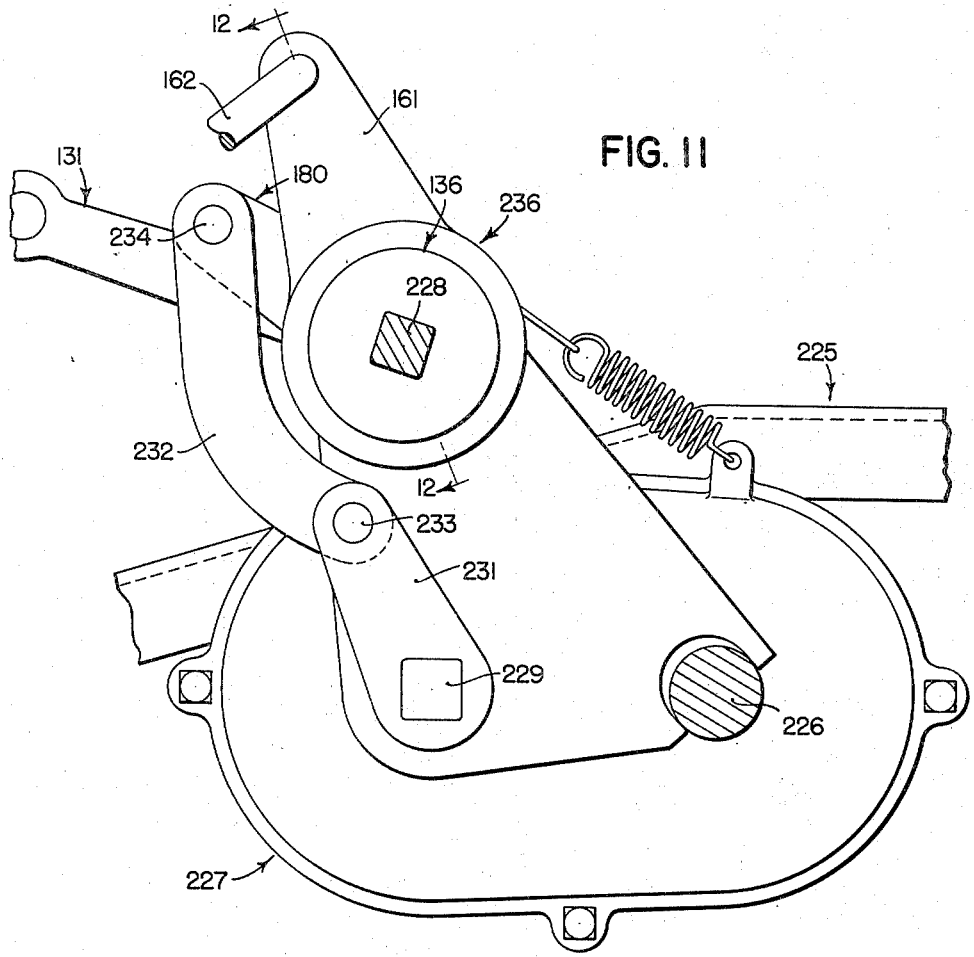
Figure 11 is an enlarged fragmentary side view, illustrating a rearrangement of the parts of the connecting unit shown in Figures 7–9 so as to accommodate a different form of clutch, wherein the lifting arm of the connecting unit swings rearwardly and downwardly or upwardly, instead of a fore and aft swinging as in Figures 6–9.

Figures 12 and 13 are sectional views similar to Figures 8 and 9 showing the same parts but in their rearranged position for the type of clutch shown in Figure 11, both Figures 12 and 13 being sections taken along the plane of line 12—12 of Figure 11.

Figure 14:
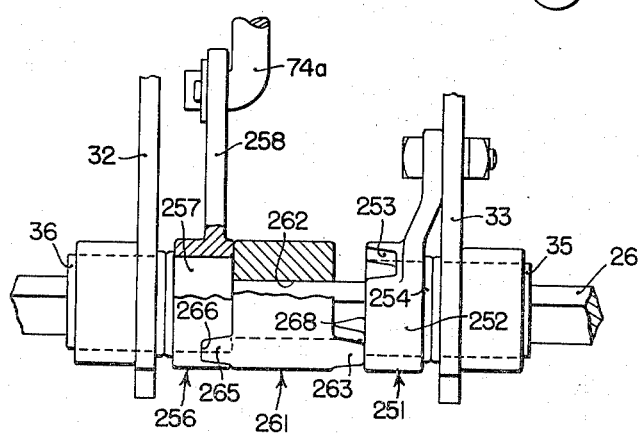

Figure 14 is a view of another modified form of the present invention, somewhat similar to the form of the invention shown in Figures 3 and 4 but arranged for operation with a power lift of the double acting type, such as the one shown in Figure 6, the parts being shown in the positions they occupy when the tools are raised.

Figure 15 is a side view of another modified form of the present invention, somewhat similar to the form shown in Figures 1 and 2 but incorporating a progressive interlocking mechanism by which two springs of unequal strengths are successively connected with and disconnected from the pressure shaft of a grain drill.

Figure 16 is a front view of the form of the invention shown in Figure 15, the parts being shown in the positions they occupy when the tools are fully lowered and the heavy spring active to hold the tools in their lowered position.

Figure 17:
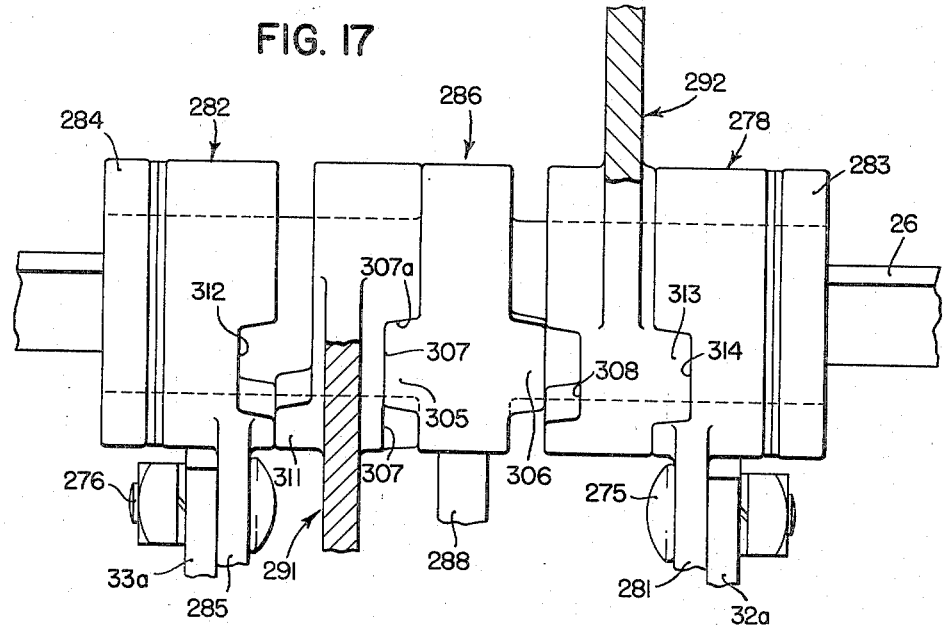

Figure 17 is a plan or top view somewhat similar to Figure 16 but showing the parts when the power lift has been actuated through a part of its range of lifting movement, sufficient to release the heavy spring from the pressure shaft and anchor it to the stationary member, picking up the light spring and connecting it with the pressure shaft at about the same time.

Figure 18:
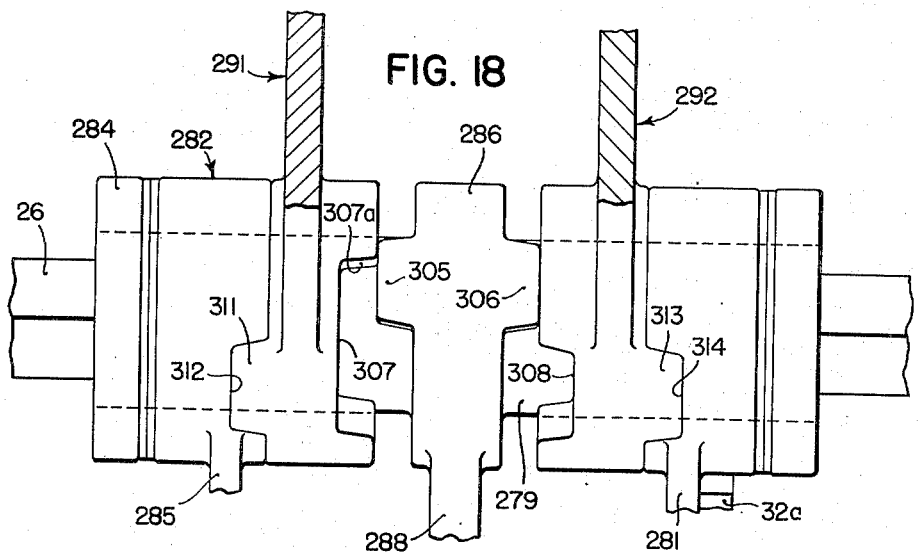

Figure 18 is a view similar to Figure 17 showing the positions of the parts when the light spring has also been disengaged from the pressure shaft and engaged with its stationary member, whereby the power lift unit is then free to continue raising the tools without having to act against either the light loading spring or the heavy loading spring.

Referring now more particularly to the form of the invention shown in Figures 1–5, the first embodiment I have chosen to illustrate the present invention is represented by a grain drill 1 having a main frame 2 supported on ground wheels 3. A hitch frame 4 includes forwardly converging angle bars which are secured to or form a part of the main frame 2 of the grain drill. A pair of hitch plates 13 are bolted to the front connected ends of the forwardly converging hitch frame angles, and the hitch plates 13 are connected by a clevis 14 with the drawbar 15 of a tractor T which serves as propelling means for the grain drill 1. The tractor T includes a power operated unit P of the type that includes a rockshaft R having an arm A. The latter and the rockshaft are operated through two ranges, the first constituting a depth adjusting range in which the arm A may be moved into and held in any one of a number of positions of adjustment, and another range in which the arm A may be moved generally upwardly through a raised or transport position, all under the control of a suitable means, such as a valve lever L. A power lift of this type is shown in U. S. Patent No. 2,311,516, issued February 16, 1943, to T. Brown et al., to which reference may be made if necessary.

The grain drill which includes a plurality of furrow openers 17, each connected with the front frame angle 9 by a generally downwardly and rearwardly extending drag frame unit 18 pivoted at its forward end to the frame angle 9. The furrow openers 17 form furrows in the soil for the deposition therein of seed delivered thereto through suitable seed feeding mechanism carried on the under side of a hopper 19 mounted on the frame 2. A rod 23 is pivoted at its lower end to the rear portion of each of the drag frames 18 and extend generally upwardly and through a swivel 24 carried at the forward end of a pressure arm 25. The several pressure arms 25 are fixed at their rear ends to a transverse rockshaft or lifting shaft 26, hereinafter referred to as a pressure shaft, that is journaled in suitable bearing supports carried by the main frame 2. Disposed about each of the lift rods 23 is a pressure spring 28 bearing at its lower end through a suitable abutment 30 against the rod and at its upper end against the swivel 24. A collar 29 is fixed adjustably to the upper end of the rod 23 so that when the pressure shaft 26 is rocked in one direction the swivel 24 engages the collar 29 and lifts the associated furrow opener 17 into a raised position. When the lifting or pressure shaft 26 is rocked in the other direction the springs 28 are compressed and yieldingly force the furrow openers into their earth-working position.

The structure so far described is largely conventional, so far as the present invention is concerned. In the larger sizes of grain drills there are two pressure shafts, each having a plurality of pressure arms secured thereto, but in order to illustrate the principles of the present invention more clearly, only one pressure shaft 26 is shown in Figure 1, and likewise only one lifting and lowering mechanism is illustrated, although it is to be understood that two or even more may be employed where desirable or necessary.

Turning now to the particular feature with which the present invention is more especially concerned, it will be seen, particularly from Figures 2 and 3, that the grain drill frame 2 includes U-shaped longitudinal members 31, the two sections 32 and 33 of which are apertured to receive the pressure shaft 26, the forward portion of the brace frame member 31 being secured in any suitable manner, as by bolts 34, to the front main frame angle 9. The pressure shaft 26 is preferably square in cross section, and where the shaft 26 passes through the apertured rear end sections of the parts 32 and 33, bushings 35 and 36 are provided, these bushings having square openings through which the pressure shaft 26 passes.

Referring now more particularly to Figure 3, adjacent the section 33 of the brace member 31 is a stationary member or stop indicated in its entirety by the reference numeral 38. The member 38 is in the form of a collar 39 having an arm 41 provided with a plurality of openings 42, in any one of which a bolt 43 may be disposed. The bolt 43 passes through an opening in the brace section 33 whereby the member 38 is held against rotation. The collar section 39 of the member 38 is apertured not only to receive the square shaft 26 but also a cylindrical sleeve or bushing 44 which encircles the pressure shaft 26. The stop member 38 is provided with a notch 46 having sloping walls 47 and 48. Adjacent the other section 32 of the brace member 31 a lifting arm member 50 is disposed about the pressure shaft and is non-rotatably connected therewith, as by having a square opening 51 receiving the square pressure shaft 26, as best shown in Figure 5. The lifting member 50 also includes a collar section 53 which is provided with a notch 54, and the latter is also provided with inclined side walls 55 and 56. The left end of the sleeve 44 preferably abuts against one end or forms a part of the collar section 53. A spring arm 58 is mounted on the sleeve 44 between the stationary arm 38 and the lifting arm 50. The spring arm 58 includes a hub section 59 mounted for rocking movement on the sleeve 44 and is provided with two projections 61 and 62, each projection having sloping side walls corresponding angularly to the sloping walls of the notches 46 and 54. The outer end 66 of the spring arm 58 is apertured to receive one end of a tension spring 67, the other end of which carries a nut member 68 into which an adjusting screw 69 is engaged. The adjusting screw 69 is anchored by a bushing 711 to the forward portion of the brace member 31, the latter being apertured for this purpose. The lower end 73 of the lifting arm 50 is apertured to receive the rear end of a lifting rod 74, the forward end of which is connected to a flexible element, such as a chain 75, that is trained through a guide 76 and sheave 77, and thence upwardly to a point of connection with the power lift arm A. It will be seen from Figure 1 that the tension exerted by the spring 67 is in a direction to rock the pressure shaft 26 clockwise and to act through the pressure arms 25 and the springs 28 to force the disks into the ground and hold them in earth working position.

In the larger sizes of drills particularly, a considerable force may be necessary to hold all of the furrow opening disks in their earth working position, particularly when passing over a hard spot, and therefore the spring or springs 67 usually are required to be relatively heavy, and of course it is necessary when raising the furrow openers into their transport position to act against the spring or springs 67. However, according to the principles of the present invention, the power lift mechanism is required to act against the spring or springs 67 only for a relatively short movement, and this when the effect of the plurality of pressure springs 28 assists in rocking the pressure shaft against the tension of the spring or springs 67. Figure 2 shows the positions of the parts when the furrow openers are in the ground and are being held in that position by the spring or springs 67. When it is desired to raise the disks the tractor power lift valve operating lever L is actuated in the proper direction so as to cause the arm A to be swung upwardly and to exert a forward pull through the flexible element 75 and the rod 74 against the end 73 of the lifting arm 50. It will be remembered that the lifting arm 50 is non-rotatably connected with the pressure shaft 26 and that, when the tools are in their lowered or operating position, as shown in Figures 2 and 3, the notch 54 receives the projection 61 while the projection 62 is disengaged from the notch 46 and is bearing against the flat end 60 of the stationary member 38, whereby the effect of the spring 67 is to resist forward swinging of the lifting arm 50. The power lift unit P of the tractor is, however, sufficient to overcome the spring 67, especially when aided by the pressure springs 28, so that continued actuation of the power lift unit P causes the upper end 66 of the spring arm to be swung rearwardly, rocking the spring arm 58 until the projection 62 thereof is in a position to enter the notch 46. Slight continued movement beyond this point will permit the projection 62 to enter the notch 46, which action is aided by the laterally directed component of force resulting from the angled relation of the wall 56 of the notch 54 acting against the angled wall 55a on the projection 61 at the other side of the spring arm. As soon as the projection 62 completely enters the notch 46, the projection 61 becomes completely disengaged from the notch 54, the end of the projection 61 then riding along the flat side 50a of the lifting arm. This is the position of the parts shown in Figure 4, from which it will be seen that now the lifting arm 50 is freed from the spring arm 58 and can move freely relative thereto, while the spring arm is itself anchored through the stationary member 38 to the frame of the grain drill. Preferably, although not necessarily, the parts are so arranged that the tension spring 67 becomes anchored to the grain drill frame at about the time the swivels 24 are engaged by the collars 29 on the lift rods 23. One advantage of this arrangement is that the tension spring 67 may be made sufficiently heavy to perform the desired function of holding all of the furrow openers in the ground, yet the power lift unit of the tractor does not have to continue acting against the tension spring 67 through the entire range of movement when lifting the furrow openers into their transport position. In effect, therefore, the mechanism is such that the tension springs 67 are connected to act against the pressure shaft 26 only when necessary to hold the disks in the ground; subsequently, during the raising action, the tension or reaction of the spring or springs 67 is transferred to the frame of the grain drill without losing the tension of the spring or springs but without requiring that the power lift continue to act against such springs. This results in materially lightening the load imposed on the power lift while providing adequate means for exerting sufficient force to hold all of the furrow openers, even in a wide grain drill, in their proper earth working position. By removing the bolt 43 and turning the stationary member 38 to different positions, the point at which the tension of the spring or springs 67 is removed from the lifting mechanism and transferred to a point of anchorage on the main frame may be varied as desired. Collars 70 are fixed, as by set screws 71, to the outer ends of the bushings 35 and 36 so as to hold them in place. It is to be noted that the pressure shaft 26 extends entirely through the spring loading mechanism just described but that the mechanism may be disposed in different positions along the pressure shaft 26 without requiring any rearrangement of the parts other than to make the necessary connection between the front end of the bracing member 31 and the main frame angle 9. By virtue of the interlocking means just described and associated parts, it will be seen that, considered in its more generic aspects, I have provided a mechanism whereby a pair of members, one having force supplying means connected therewith, is associated with a pressure shaft of a grain drill and a stationary part whereby, in response to a given amount of movement in one direction, one of said pair of members becomes anchored to the frame and held thereby against further movement while the other member is free to continue its movement. In the form of the invention just described, the member to which force is applied, as through the tension spring 67, is in one position connected with the pressure shaft and in the other position is anchored to the grain drill frame while the other member is then freed for movement relative to the spring arm. This type of mechanism is particularly adapted for power lift units of the type, such as the power lift unit P on the tractor T, in which power is exerted by the power unit in only one direction, namely, in the lifting direction, the tools being generally lowered by gravity and/or, in the present instance, aided by a loading spring or springs, such as the tension spring 67.

The principles of the present invention are also applicable to implements of the type in which a power operated unit, such as a double acting self-interrupting clutch, is employed for both raising and lowering the tools by power. In an arrangement of this kind, particularly when incorporated in a grain drill but not necessarily limited to an implement of that type, it is desirable to relieve the clutch of the load of holding the tools in the ground. In the form of the present invention now to be described, suitable interlocking mechanism is provided whereby after the clutch has been actuated a predetermined amount in the direction to force the tools into the ground, the connection between the tools and/or their raising and lowering means and the clutch is automatically interrupted, the tools and/or their raising and lowering means then being anchored to the main frame of the grain drill, after which the clutch is free to move into a position of interruption in which no load is then imposed on the clutch. This form of the invention will now be described.

Referring first to Figure 6, the grain drill in this form of the invention is indicated in its entirety by reference numeral 100 and includes a main frame 101 supported by ground wheels 102 and carrying a seed box 103, the latter being equipped with seed feeding devices 104 of conventional construction discharging into seed tubes 105 which lead downwardly to disk furrow openers 106. The furrow openers are connected with the front angle 107 of the frame 101 by drag bars similar to those described above. The frame 101 also includes longitudinally extending bars 109 upon which a pressure shaft 110 is mounted, as by suitable bearings 111 supported by brackets 112 carried by the frame 101. In this form of the invention the right-hand ground wheel 102 drives a shaft 115 through chain and sprocket means, the shaft 115 being supported by suitable bearing brackets 116 fixed to certain of the longitudinal frame bars 109. The shaft 115 drives a self-interrupting clutch of the double acting type, that is, one which drives the driven part positively in both directions. The present invention is not especially concerned with the particular details of the self-interrupting clutch unit 120 since the clutch preferably employed in the form of the invention shown in Figure 6 being like that shown in the co-pending application filed by William A. Hyland and myself, Serial No. 528,795, filed of even date herewith now Patent No. 2,432,897, issued Dec. 16, 1947. Briefly, the clutch 120 includes a driving member 121 fixed to rotate with the shaft 115 and a driven member 122 adapted intermittently to be connected with the driving member under the control of a pair of diametrically mounted latches 123. A clutch control lever 124 is mounted on the frame and cooperates with the latches 123 to engage and disengage the driving and driven parts of the clutch. The driven member 122 includes a crank section 126 that is caused in operation to be rotated through approximately 180 degrees, at which point the clutch is automatically interrupted. The succeeding operation of the clutch control lever 124 serves to engage the driving and driven clutch parts to cause the crank section 126 to be moved back from its second mentioned position into the position shown in Figure 6. Thus, the crank section 126 is driven in a positive manner from one position to another and then subsequently is driven also in a positive manner from that position back to the first position. With a clutch of this type it may be undesirable to impose the load of holding a considerable number of disks in the ground during operation onto the clutch, and according to the principles of the present invention, suitable mechanism connecting the crank 126 with the pressure shaft 110 is provided, which mechanism includes interlocking means which, when the tools are lowered, operate to connect the tools directly to the main frame and to release the power lift clutch therefrom, the interlocking means being substantially of the type shown in Figures 1–5 but arranged somewhat differently.

Referring now more particularly to Figures 6 to 10, the pressure shaft 110 of the grain drill 100 is square in section and has fixed thereto a plurality of pressure arms 131. Pressure rods 132 extend upwardly from each of the furrow openers and pass through apertured swivels 133 pivoted to the associated pressure arms 131. Pressure springs 134 extend between the swivels and suitable adjustable abutments at the lower ends of the springs. A bushing 136 is provided with a square opening therethrough to receive the pressure shaft 110 and is disposed on the latter in a position between adjacent pressure arms 131. The bushing 136 is of particular construction. As best shown in Figure 10, the bushing 136 is provided at one end with a limit flange 137 and adjacent thereto a cylindrical section 138 of somewhat reduced diameter. Adjacent the cylindrical section is a portion 139 of square cross section, followed by a shank portion 141 of cylindrical section having a diameter less than the diameter of the other cylindrical section 138. The section 141 is slabbed off at opposite sides, as at 142 and 143, such sides being in planes parallel to two opposite sides of the squared section 139. The bushing 136 is provided with a square opening therethrough as indicated at 144.

The connecting and interlocking mechanism, which is indicated in its entirety in Figure 6 by the reference numeral 145 and which includes the bushing 136 just described, is mounted as a compact assembly on the pressure shaft 110. A stationary arm 150 is provided with a hub section 151 which has a cylindrical opening 152 (Figure 8) adapted to receive and closely fit against the cylindrical section 138 of the bushing 136. A pair of axially directed lugs or projections 153 is formed on the member 150, each lug having an inclined face 154 and a substantially perpendicular face 155, the latter being disposed in a radial plane. Immediately adjacent the perpendicular face 155 of each of the lugs 153 is a notch 157 extending axially into the body of the member 150. Between the two companion lug and notch portions the side or face of the member 150 is flat and disposed in a plane perpendicular to the axis of the pressure shaft, as indicated at 158. At the side of each notch 157 opposite the perpendicular face 155, a wall is inclined, as indicated at 159. The stationary member 150 includes an extended arm section 161 which is apertured to receive one end of an adjusting link 162, the other end of the latter being threaded, as at 163, and is passed through a bracket 164 secured to the frame of the drill.

A pair of lock nuts 165 are disposed on the threaded end of the rod 162 and serve as means for adjustably fixing the stationary member 150 in different positions of adjustment.

A companion piece 168 is disposed about the bushing 136 and is provided with a square opening 167 the size to fit against the squared section 139 of the bushing 136. The part 168 is provided with a pair of lugs or projections 169 and associated notches 171. The lugs and notches 169 and 171 are of substantially the same configuration as the lug and notch means 153—157 described above, each lug 169 and notch 171 having perpendicular and inclined walls or faces indicated at 173 and 175, respectively. Between the associated lugs and notches 169, 171, the member 168 is substantially flat, as indicated at 176. The opposite face of the member 168 is coplanar, as indicated at 177.

A power lift actuated member, indicated in its entirety by the reference numeral 180, includes a hub section 181 that is mounted for rotation on the cylindrical section 141 of the bushing 136, adjacent the squared section 139. A cylindrical opening 182 in the hub section 181 is of a diameter to fit snugly about the cylindrical surface 141. The hub 181 of the member 180 is also provided with a pair of lugs 185, each having an inclined or angled face 186, opposite a perpendicular face 187. Adjacent each lug 185 is a notch 189, one end of which being in the form of an angled face or wall 191. The member 180 includes an arm section 192 which is bifurcated, as at 193, and apertured to receive a pin 194 by which a link 195 is connected between the member 180 and the power lift crank pin 126, as best shown in Figure 6. Laterally outwardly of the member 180 is a collar indicated in its entirety by the reference numeral 201 and which is also provided with a pair of lugs 202, each having a perpendicular face 203 and an inclined or angled face or wall 204, and adjacent each lug 202 is a notch 205, each notch having an inclined or angled face or wall 206. Between the lug and notch at one side and the lug and notch at the other side, the collar 201 has flat faces 209. The central opening 207 of the collar 201 is formed with flat sides 208 so as to fit non-rotatably against the slabbed off sections 142, 143 of the bushing 136. A nut 210 is threaded onto the end of the bushing 136 opposite the flange 137 and bears against a washer 211 likewise non-rotatably connected with the bushing 136. The nut and washer hold the several parts in assembled position, as for example, shown in Figures 7 and 8, but are arranged to accommodate a certain amount of lateral displacement of the parts 168 and 180 as well as limited relative rocking or angular movement of the parts 180 and 201, together with the pressure shaft 110. The interengaging cam faces on the parts 150 and 168 and on the parts 180 and 201 are protected from dirt and the like by means of overhanging flanges, one flange 215 being formed on the member 150 and the other flange 216 being formed on the member 180.

The operation of this form of the invention is substantially as follows.

The position of the parts of the interlocking and connecting mechanism shown in Figure 8 correspond to the positions of these parts when the tools are lowered into their operating or earth-working position and held in that position, not by the power lift unit 120 but by the interlocking mechanism 145. It will be remembered that the stationary member 150 is held in adjusted position relative to the frame by the rod 162 and associated parts. In Figure 6 the crank pin 126 has been swung forwardly to lower the tools, and the corresponding positions of the interlocking and connecting mechanism are shown in Figure 8. From this figure, in which the bushing 136 has been omitted for purposes of clarity, it will be seen that the lug 169 on the part 168 is in full engagement with the notch 157 of the member 150, the inclined face 175 of the lug 169 fitting snugly against the inclined wall 159 of the notch 157, and likewise the perpendicular face 173 of the lug 169 is in engagement with the perpendicular wall 155 of the notch 157. Thus, so long as the parts 150 and 168 remain in that position, it being remembered that the part 168 has the square opening therein which engages the squared section 139 of the bushing 136, the bushing and the pressure shaft are interlocked with the stationary member 150. The part 168 has its flat side 177 in engagement with the flat side 180a of the adjacent part 180, this being the part to which the link 195 is connected. The lug 185 on the part 180 bears against the flat face 209 of the part 201, and similarly the lug 202 bears against the adjacent flat face 212 between the lugs 185 on the part 180. The part 201 is, like the part 168, non-rotatably connected with the bushing 136 and through it with the pressure shaft 110. So long as the lug 185 on the part 180 remains out of engagement with the corresponding notch 205 of the member 201, the other part 168 is held against lateral displacement and therefore acts to interlock the bushing 136 and the pressure shaft 110 to the stationary member 150 while, on the other hand, the member 180 is capable of rocking movement into any position between one where the inclined face 186 engages the inclined face 204 on the lug 202 and the point where the lug 185 is ready to enter the notch 205. In this position, therefore, the power lift is freed of all effort so far as holding the tools in the ground except, of course, for the frictional bearing of the lugs 185 and 202 against the flat faces 209 and 212.

When the power lift clutch 120 is operated to raise the disks, the first part of the movement of the clutch is idle, the crank pin 126 swinging downwardly and rearwardly (Figure 6) and moving the arm 192 rearwardly until the lug 185 on the part 180 starts to enter the notch 205 on the part 201. As the lug 185 enters the notch 205 the member 180 is permitted to shift laterally, to the right as viewed in Figure 8, and this lateral movement permits the part 168 to shift laterally, the parts 168 and 201 turning with the pressure shaft. After a short displacement the lug 169 on the part 168 rides out of the notch 157, and continued movement of the power lift unit 120 then rocks the pressure shaft 110 and raises the disks into their transport position. The parts of the power lift clutch are so arranged that when the tools are raised, a roller r on the lever 124 drops in a notch on the driven member 122 of the clutch, thus locking the driven member of the clutch against further movement and holding the tools in their raised position. However, the weight of the raised tools is not excessive and the clutch 120 is fully capable of holding the tools in their transport position.

When lowering the tools into their earth working position the clutch unit 120 is operated to drive the crank 126 from its rearward position back into the position shown in Figure 6, thus swinging the arm 192 from a rearward position into a forward position, as shown in Figure 6. During this action the parts of the interlocking and connecting mechanism move from the positions shown in Figure 9 into the positions shown in Figure 8. It will be observed that, as shown in Figure 9, the pressure shaft 110 and the bushing, with which the parts 201 and 168 rotate, are operatively connected with the lifting arm 180 by virtue of the complete engagement of the lug 185 in the notch 205 of the member 201, while the part 168 is disposed in a position with its lug 169 riding along the flat surface 158 of the stationary member 150. The actuation of the clutch unit 120 to lower the tools results first in the forward movement of the lifting arm member 180. The drive of the clutch in this direction is positive, and therefore the energy delivered to the clutch is utilized in forcing the tools into the ground. This action continues until the lug 169 on the part 168 approaches and begins to enter the notch 157. As the lug 169 enters the notch 157 the lifting arm 180 is permitted to shift laterally, withdrawing the lug 185 from the part 201. This shifting action continues until the lug 169 is completely engaged in the associated notch 157, at which time the lug 185 is entirely disengaged from the part 201. This frees the lifting arm 180 from its connection with the pressure shaft since it is disengaged from the part 201 that connects it with the pressure shaft. At the same time, the part 168, which is non-rotatably connected with the pressure shaft, is now fully engaged with the stationary member. Thus, the action of the power lift is to first force the tools into the ground positively and then interlock the tools with the frame of the grain drill, and then continue further until the clutch is relieved of any load as regards holding the tools in position is concerned. The two parts 168 and 201, both being connected with the pressure shaft in a non-rotatable manner, constitute a member which, in one position, is interlocked with the power lift actuated arm 180 and in another position is interlocked with the stationary member 150 while it is freed from its connection with the power lift actuated arm.

In the form of the invention just described above the parts of the interlocking and connecting mechanism are so arranged that, as best shown in Figure 7, the arm of the stationary member 150 extends generally upwardly and rearwardly from the pressure shaft while the arm section 192 of the lifting member 180 extends generally forwardly in the lowered position of the tools and is swung rearwardly into a position approaching the stationary arm when the tools are raised. This is a very convenient arrangement where, as shown in Figure 6, the power lift clutch unit is disposed forwardly (or rearwardly), generally speaking, of the pressure shaft. For other installations, it may be desirable, for example, to mount the power lift clutch or other operating unit generally above or below the pressure shaft, in which case the lifting arm would be mounted for generally vertical swinging, rather than horizontal swinging, as shown in Figure 7. The interlocking and connecting mechanism shown in Figures 6-10 may readily be rearranged to accommodate a different operating position of the lifting arm relative to the stationary member, and by way of example I have shown in Figures 11, 12 and 13 an arrangement wherein a grain drill, indicated in its entirety by the reference numeral 225, similar to the type of grain drill shown in Figure 1, is provided with a self-interrupting clutch unit of the type that is driven from the axle 226 of the grain drill and in which the clutch unit, indicated in its entirety by the reference numeral 227, is mounted below the pressure shaft 228, rather than in front of the same as shown in the form of the invention illustrated in Figure 6. The clutch unit 227 may be of conventional construction, so far as the present invention is concerned, and includes a driving member deriving power from the axle which, in turn, is driven by one or both of the ground wheels, and a driven member that includes a crank shaft 229 and a crank arm 231. A link 232 extends generally vertically and is pivoted to the crank arm 231, as at 233, and at its upper end is pivoted, as at 234, to the lifting arm of the interlocking and connecting mechanism which, in Figure 11, is indicated by the reference numeral 236. However, the unit 236 is for all practical purposes exactly the same as the connecting and interlocking mechanism 145 and employs identical parts except that they are arranged in a slightly different way. Hence, the reference numerals employed for the parts of the connecting and interlocking mechanism 145 have been employed in Figures 12 and 13.

Referring particularly to Figure 12, it will be seen that this figure corresponds to Figure 8, described above, and that the member 168 having a square opening 167 therethrough and the associated member 150 have been assembled on the bushing 136 in a position spaced 90-degrees from the position shown in Figure 8. This is possible because, as will be clear from Figure 10, the part 168 and its companion stationary part 150, may be assembled on the bushing 136 in any one of of four positions, spaced apart angularly 90-degrees, while the part 201 and its companion part 180, can be assembled in only two possible positions, 180 degrees apart. Such rearrangement is made possible by the fact that the two parts 168 and 201 are made separable so as to be capable of occupying different relative angular positions with respect to one another, yet in so far as they are both non-rotatably connected with the bushing 136 and through it with the pressure shaft, they constitute a single member that may be interlocked either with the stationary member 150 or with the lifting member 180.

In the forms of the invention as so far described, I have shown, first, an arrangement wherein a lifting arm is connected non-rotatably with the pressure shaft and a spring biased arm is connected either with a stationary member or with the lifting arm, according to the position of the lifting arm and the pressure shaft, and second, I have shown an arrangement in which the pressure shaft is connected either with a stationary member or with the lifting member, according to the position of the latter within its range of movement, this form being particularly adapted for use with a self-interrupting clutch of the double acting type that is positively driven in both directions. It may, however, be desirable to provide an arrangement, similar to the type described above employing the spring biased arm, but so constructed and arranged to accommodate a double acting type of lifting unit, such as a double acting hydraulic unit of the type shown in the U. S. Patent to Harold Brown, 1,929,804, issued October 10, 1933, or some form of double acting self-interrupting clutch, such as the one shown in Figure 6.

Figure 14 shows such an arrangement, similar to Figure 3, and now referring to Figure 14, the pressure shaft 26 and the frame parts 32 and 33 are the same parts shown in Figure 4 and hence have been identified by the same reference numerals. Likewise, the bushings 35 and 36, and the associated collars, are the same as shown in Figure 3. In Figure 14, however, a stationary member 251 is provided with a hub section 252 having a notch, as at 253 and is mounted on a short sleeve 254 on the pressure shaft, whereby rocking movement of the latter is accommodated. At the other side of the frame member 31 a lifting member 256 is disposed about the pressure shaft 26, but, unlike the form of invention shown in Figure 3, the lifting arm 256 is mounted for rocking movement on the pressure shaft 26, as by being disposed on a short sleeve 257. The member 256 is provided with an arm extension 258 in which the lifting link 74a, extending to a double acting lifting unit, is pivoted, as in Figures 4 and 5. Disposed between the members 251 and 256 is a third member 261 having a square opening 262 therein so as to be non-rotatably connected with the pressure shaft 26 but capable of limiting axial movement with respect thereto. The member 261 is provided with a lug 263 that is shaped to enter the notch 253 in the member 251, the notch and lug having angled or sloping walls, as in the notch and projection means described above in connection with the other forms of the invention. A second lug 265 is formed at the other side of the member 261 and is adapted to cooperate with a notch 266 formed in the lifting member 256.

The operation of this form of the invention is substantially as follows.

In Figure 14 the parts are shown in the positions they occupy when the furrow openers connected with the pressure shaft 26 are raised. In this position the lug 263 rides along the flat face 268 of the stationary member 251 and the opposite lug 265 is engaged with the lug 266 on the lifting member 256. Thus, the weight of the tools and associated parts tending to rock the shaft 26a is sustained by the power lift unit associated therewith. When it is desired to lower the tools, the power lift unit is actuated to swing the arm 258 rearwardly (upwardly in Figure 14). The members 256 and 261 move together until the lug 263 begins to enter the notch 253 on the stationary member 251. As this occurs the lug 265 is withdrawn from the notch 266 until, when the lug 263 fully seats in the notch 253, the lug 265 is fully withdrawn from the notch 266, after which the lifting arm 256 is freed from its connection with the pressure shaft through the member 261, and then the lifting arm 256 may continue further without restraint, the pressure shaft 26 being interlocked through the lug 263 and notch 253, with the stationary member 251. The reverse action takes place when lifting the tools. First, the power lift is actuated and shifts the lifting member 256 through its idle range until the notch 266 reaches a position to permit the lug 265 to enter, and as this occurs the lug 263 is withdrawn from the notch 253 after which the pressure shaft 26 and the member 261 move with the lifting member 256 in the raising direction. As in the other forms of the invention described above, the angle of the inclined or sloping walls on the lugs and cooperating notches insure the positive lateral movement of the shiftable parts and thus facilitates their disconnection from one of the members and their connection with the other member.

Another form of the invention, also similar to the form shown in Figures 1-5, is shown in Figures 15-18. In this form, the grain drill frame 2 carries a brace member 31a that is secured at its front portion to the frame angle 9. The rearwardly extending sections 32a and 33a of the brace member 31a are slotted to receive adjustable clamping bolts 275 and 276, respectively. A left hand stationary member 278 is apertured to receive the left end of a sleeve 279 and has a clamping section 281 which is also slotted to receive the associated bolts 276. The angular position of the member 278 about the pressure shaft 26 may be adjusted by loosening the bolts 276 and shifting the position of the member 278. A right hand stationary member 282 is similarly constructed and likewise adjustably connected to the brace member 31a by the right hand clamping bolts 275. The sleeve 279 extends through an opening in the stationary member 282, and both ends of the sleeve 279 are threaded to receive nuts or collars 283 and 284 by which outward displacement axially of the pressure shaft 26, of the stationary members 278 and 282 is prevented. Centrally of the sleeve 279 a lifting member 286 is rigidly secured, as by welding or the like, and this member includes a cam or hub section 287 and an arm extension 288 to which a lifting link 289 is pivoted. At its forward end, the link 289 preferably is connected with a tractor power lift in substantially the same manner as is illustrated in Figure 1.

A pair of spring loaded members 291 and 292 are mounted on the sleeve 279 for rocking movement relative thereto between the center member 286 and the two stationary members 278 and 282. A bracket 295 is fixed to the front portion of the brace member 31a and is provided with a pair of apertures to receive adjusting bolts 296 and 297. A relatively light spring 298 is hooked at its rear end into an opening in the outer end of the arm member 291 and is connected at its forward end with the rear end of the adjusting bolt 296. A relatively heavy spring 299 is hooked at its rear end into the outer end of the arm 292 and at its forward end is connected with the adjusting bolt 297. A stop 301 is carried by the stationary member 282 and limits the forward movement of the arm 291 to which the light spring 298 is connected. Thrust washers are disposed between each of the stationary members 278 and 282 and the associated member 283 and 284.

A pair of lugs 305 and 306 are formed on the center member 286, and an elongated notch 307 is formed on the hub section of the lifting arm member 291. A notch 308 is formed on the hub section of the other arm member 292. A lug 311 is formed on the hub section of the arm member 291, generally opposite the elongated notch 307, and the lug 311 cooperates with a notch 312 formed on the stationary member 282. Opposite the notch 308 in the hub section of the arm member 292 is a lug 313 which cooperates with a notch 314 formed at the inner side of the stationary member 278.

The operation of this form of the invention is substantially as follows.

The raising of the tools, which are connected with the pressure shaft 26 by lifting rods, compression springs and pressure arms in substantially the same way as shown in Figure 1, is accomplished by a forward pull exerted through the link or rod 289 against the lower end of the lifting arm section 288. The parts are shown in Figures 15 and 16 in the positions they occupy when the tools are lowered and held in operating position. It will be seen from Figure 16 that, when the parts are in their lowered position, the relatively heavy spring which is connected with the upper end of the arm 292, exerts a force through the notch 308 and lug 306 against the lifting arm member 286. It will be remembered that this member is fixed to the sleeve 279, and as best shown in Figure 15, the sleeve 279 has a square openings 318 in which the pressure shaft 26 is non-rotatably received. It will also be seen from Figure 16 that in this position of the parts the lug 313 on the member 292 is riding along the flat inner face of the stationary member 278 and is entirely disengaged at this time from the notch 314. Therefore, the full effect of the heavy spring 299 is exerted through the pressure shaft 26 and associated parts to hold the tools in their working position. It will also be seen from Figure 16 that the arm 291, to which the light spring 298 is connected, is held against the stop member 301 by the tension of the light spring but that, due to the fact that the forward face 307a of the elongated notch 307 is not in engagement with the lug 305, the light spring does not act against the lifting member 286 and therefore its bias is not imposed on the pressure shaft 26 or the tools. However, the lug 311 is disengaged from the notch 312 and bears lightly against the inner flat face of the stationary member 282.

When it is desired to raise the tools the tractor power lift is actuated so as to exert a forward pull through the rod 289 against the arm 288, swinging the same in a clockwise direction as viewed in Figure 15. This movement of the center member 286 does not at this time move the light spring arm 291, due to the space between the lug 305 and the face 307a, but since the lug 306 is fully engaged in the notch 308 of the heavy spring arm member 292, the first movement of the power lift acts against the bias exerted by the heavy spring 299. However, this does not require excessive pressures or forces since at this time the compression springs around the lifting rods aid in the upward movement of the associated pressure arms and the corresponding rocking movement of the pressure shaft 26. After the lifting movement of the power lift has continued for a short period of time, the arm 292 has been rocked relative to the stationary member 278 a distance sufficient to cause the lug 313 to enter the notch 314, the arm 292 shifting slightly to the right (Figure 16). This movement serves to cause the notch 308 to disengage from the lug 306 so that when the lug 313 is fully seated in the notch 314 the lug 306 is fully disengaged from the notch 308 on the heavy spring member 292. This results in anchoring the heavy spring to the stationary member 278 so that its bias is no longer imposed on the member 286 and is no longer effective to resist the further upward movement of the tools. However, by the time the lifting member 286 has been rocked through a sufficiently angular extent to disengage the notch 308 and the lug 306, the lug 305 at the other side of the member 286 engages the face 307a and therefore picks up the light spring arm 291. The continued lifting movement of the lifting member 286 then shifts the arm 291 rearwardly until the lug 311 enters the notch 312 on the other stationary member 282. When this has occurred the light spring 298 is then anchored to the stationary member, and hence through it to the frame of the grain drill, and thereafter the further movement of the lifting member 286 by the tractor power lift is continued without additional stretching of the springs 298 and 299 and without any further resistance except, of course, the weight of the tools.

When lowering the tools from their raised position into their lowered position a reverse action occurs. After the lowering movement has progressed for a length of time the light spring arm 291 is disengaged from the notch 312 and imposes its bias on the lifting member 286 aiding the further movement of the tools in the downward direction. It will be understood that the power lift is of the type in which the tools lower by virtue of their own weight and no energy is available to secure a positive lowering action as in the second form of the invention described above. After the effect of the light spring 298 has continued for a time, the movement of the lifting member 286 in the lowering direction brings the lug 306 into a position in which it starts to engage in the notch 308 of the heavy spring member 292. This permits the latter member to emerge from the notch 314 whereupon the effect of the relatively heavy spring 299 is then imposed to aid in forcing the tools into the ground. At about this point the light spring 291 engages the stop 301, and hence is held in that position while the tension exerted by the heavy spring 299 is continually exerted to hold the tools in their lowered position. The tension of the springs 298 and 299 may be adjusted by turning the nuts on the adjusting bolts 296 and 297. It is to be noted that by virtue of this form of the present invention, a pair of biasing or loading springs is employed and is so connected through the interlocking and connecting mechanism that the action of the springs is imposed on the pressure shaft in a progressive manner, that is, first one spring is caused to act against the pressure shaft and then its effect is removed while the other and heavier spring is then caused to act against the tools to hold them in the ground. By virtue of this progressive action, the load to be imposed on the tractor power lift when raising the tools becomes more nearly uniform with the result that excessively high pressures or forces are not required at any point in the operation of the mechanism.

While I have shown and described above the preferred structure in which the principles of the present invention have been shown and described, it is to be understood that my invention is not to be limited to the particular details shown and described above, but that, in fact, widely different means may be employed in the practice of the broader aspects of my invention.

What I claim, therefore, and desire to secure by Letters Patent is:

1. In a grain drill having a frame, a pressure shaft, and a plurality of furrow openers operatively connected with said shaft to be raised and lowered thereby, the combination of a stationary support in which said shaft is received for rocking movement, a pair of members mounted on said shaft, one being disposed axially between the other member and said support, the latter and said one member having cooperating notch and projection means adapted to engage as a result of rocking and axial movement of said one member relative to said support, said two members also having cooperating notch and projection means adapted to engage as a result of relative rocking and axial movement of said members, biasing spring means connected to said one member, the latter being mounted loosely on said pressure shaft, said other member being fixed to said pressure shaft, and power operated means connected to said other member for rocking said shaft and said one member from a position in which the latter is engaged with said other member into a position in which said one member is in a position to engage said stationary support and disengage from said other member, whereby said one member is interlocked with said stationary support and acts against the latter to anchor said biasing spring means thereto, and said other member is freed from said spring means and from said one member so as to move said pressure shaft an additional amount.

2. In a grain drill having a frame, a pressure shaft, and a plurality of furrow openers operatively connected with said shaft to be raised and lowered thereby, the combination of a stationary support in which said shaft is received for rocking movement, a pair of members mounted on said shaft, one being disposed axially between the other member and said support, the latter and said one member having cooperating notch and projection means adapted to engage as a result of rocking and axial movement of said one member relative to said support, said two members also having cooperating notch and projection means adapted to engage as a result of relative rocking and axial movement of said members, means connecting said one member to said shaft in non-rotatable relation, and operating means connected with said other member for rocking the latter from a position in which said members are interengaged and movement imparted to said other member by said operating means is transmitted to said one member and through it to said shaft, the notch and projection means on said support and said one member being disposed in a position providing for disengagement of said members with each other and engagement of said one member with said support, whereupon said pressure shaft is held in one position by said support and said other member and the operating means associated therewith may continue their movement into a third position.

3. In a grain drill having a frame, a pressure shaft, and a plurality of furrow openers operatively connected with said shaft to be raised and lowered thereby, the combination of a stationary support in which said shaft is received for rocking movement, a pair of members mounted on said shaft, one being disposed axially between the other member and said support, the latter and said one member having cooperating notch and projection means adapted to engage as a result of rocking and axial movement of said one member relative to said support, said two members also having cooperating notch and projection means adapted to engage as a result of relative rocking and axial movement of said members, power operated means for rocking one of said members from a position in which it is engaged with the companion member into a position in which said first mentioned one member is in a position to engage said stationary support and disengage from said other member, whereby said first mentioned one member is interlocked with said stationary support and is held against further movement and the other member is freed from said one member for further movement relative thereto, and means operatively connecting one of said pair of members with said pressure shaft.

4. In a grain drill having a plurality of furrow openers and a pressure shaft operatively connected therewith for raising and lowering said furrow openers, a power operated unit operatively connected with said shaft for raising said furrow openers, biased means releasably connected with said pressure shaft for forcing said furrow openers into the ground, and mechanism connected with said biased means and responsive to a given movement of said biased means and said power unit for disconnecting said biased means from said pressure shaft.

5. The invention set forth in claim 4, further characterized by said mechanism including means for retaining said biased means in a biased condition after its disconnection from said pressure shaft.

6. The invention set forth in claim 4, further characterized by said grain drill having a frame and said mechanism including means for anchoring said biased means to said frame and thereby retaining said biased means in a biased condition after its disconnection from said pressure shaft.

7. In an agricultural implement, power lift apparatus comprising a shaft, tool means to be raised and lowered connected with said shaft, a power operated member fixed to said shaft, a spring-biased part, means rotatably mounting said part on said shaft, a stationary reaction member, means releasably connecting said part with one of said members, and means responsive to the amount of movement of said spring biased part relative to said reaction member for disconnecting said spring-biased part from said one member and connecting it with the other member.

8. In combination, a shaft, a stationary member and a movable member mounted on the shaft, the movable member being movable angularly about the axis of said shaft, a third member disposed between and axially shiftable along said shaft relative to said first two members, said third member being also movable angularly about the axis of said shaft, means serving as a notch and projection on said third member and one of the first two members, respectively, and means serving as another notch and projection on said third member and the other of said first two members, said members being axially spaced so that only one notch and projection means can be engaged at a time and said two notch and projection means being angularly spaced about the axis of said shaft, whereby after a given angular movement of said movable member said third member is free to shift axially so as to disengage one of said notch and projection means and engage the other.

9. A mechanical movement comprising a shaft, a stationary support in which said shaft is journaled for rocking movement, a collar shiftable axially on but held against rotation relative to said shaft, one of said support and collar having a projection and the other having a notch to receive said projection when the collar and support are disposed in a given relative position angularly about the axis of said shaft, a member mounted for rocking movement on said shaft at the side of said collar opposite said support, means for holding said member against displacement axially of said shaft away from said collar, one of said collar and member having a projection and the other having a notch to receive said last mentioned projection, the axial spacing of said support, collar and member accommodating the disengagement of one set of said notches and projections when the other notch and projection are in engagement.

10. A mechanical movement comprising a shaft, a stationary support in which said shaft is journaled for rocking movement, a pair of members mounted on said shaft, one being disposed axially between the other member and said support, the latter and said one member having cooperating notch and projection means adapted to engage as a result of rocking and axial movement of said one member relative to said support, said other member being non-rotatably connected with said shaft, and said one member being shiftable axially of said shaft relative to said other member and said support, said two members also having cooperating notch and projection means adapted to engage as a result of relative rocking and axial movement of said members, and means for rocking one of said members from a position in which it is engaged with the companion member into a position in which said first mentioned one member is in a position to engage said stationary support and disengage from said other member, whereby said first mentioned one member is interlocked with said stationary support and is held against further movement and the other member is freed from said one member for further movement relative thereto.

11. In an agricultural implement, an earth working tool adapted to be raised and lowered, a stationary member and a pair of movable members, interlocking mechanism acting between said members whereby when one of said pair of members is interlocked with said stationary member the other member is free to move relative to said stationary member, means for applying force to one of said movable members, and means connecting the other of said movable members with said earth working tool.

12. In an agricultural implement, an earth working tool adapted to be raised and lowered, a stationary member and a pair of movable members, interlocking mechanism acting between said members whereby when one of said pair of members is interlocked with said stationary member the other member is free to move relative to said stationary member, said interlocking mechanism also including means whereby said one member may be interlocked with the other member to move with the latter relative to said stationary member, biasing spring means connected with said one member to urge the latter and said other member in one direction, and means connected with said other member for moving both members into a position in which said one member becomes interlocked with said stationary member and the other member becomes disengaged from said one member.

13. In an agricultural implement, an earth working tool adapted to be raised and lowered, a stationary member and a pair of movable members, interlocking mechanism acting between said members whereby when one of said pair of members is interlocked with said stationary member the other member is free to move relative to said stationary member, means for applying a lowering force to said one of said pair of movable members, and means for applying a lifting force to the other of said members.

14. In an agricultural implement, an earth working tool adapted to be raised and lowered, a stationary member and a pair of members connected with said tool to raise and lower it, a fourth member disposed between the members of said pair, a first interlocking means acting between said stationary member and one of said pair of members, a second interlocking means acting between the other of said pair of members and said fourth member, said second interlocking means being arranged so that when one of said pair of members is interlocked with said fourth member, the latter and said pair of members are movable relative to said stationary member, and said first interlocking means being arranged so that when the other of said pair of members is interlocked with said stationary member, said tool is connected with the stationary member and said fourth member is freed for movement relative to said pair of members.

15. In an agricultural machine, means serving as a frame, an earth working tool adapted to be raised and lowered, a rockable shaft journaled on said frame and operatively connected with said tool, a first member stationarily connected with said frame means, a pair of members mounted on said shaft in non-rotatable relation but shiftable axially relative thereto, a first interlocking notch and projection means carried by said stationary member and the axially shiftable member adjacent thereto whereby, when said adjacent member is shifted toward said stationary member said interlocking means holds said members against relative movement and when said adjacent member is shifted away from said stationary member, said members are released for relative movement, a fourth member disposed between said axially shiftable members and rockable relative to said shaft, interlocking notch and projection means carried by said fourth member and the other of said axially shiftable members whereby when said other member is shifted toward said fourth member they are connected together for simultaneous movement and when said other member is shifted away from said fourth member the latter is freed for movement relative thereto, and raising and lowering means connected with said fourth member for rocking said shaft, said two interlocking means being timed whereby movement of said fourth member through a predetermined range carries with it said other of said axially shiftable members and said shaft, further movement of said fourth member serving to shift said adjacent member into interlocking connection with said stationary member whereby the latter holds said adjacent member and said shaft against further movement while said fourth member is freed for continued movement relative to both of said pair of members.

16. The invention set forth in claim 15, further characterized by means connecting one of said pair of axially shiftable members with said shaft in different angular positions relative to the other axially shiftable member, so as to provide for varying the angular relationship between said stationary member and said fourth member.

17. The invention set forth in claim 15, further characterized by means providing for securing said stationary member to said frame in different angular positions.

18. In an agricultural implement, an earth working tool adapted to be raised and lowered, a stationary member, three coaxially disposed relatively movable members, the one member at one side thereof being disposed adjacent said stationary member, the latter and said one member having interlocking means whereby in one relative angular position said one member is engaged with and held against movement by said stationary member, a second stationary member adjacent the other member at the opposite side of said movable members, said other member and said second stationary member also having interlocking means whereby in one relative angular position said other member is engaged with and held against movement by said second stationary member, a pair of springs connected respectively with said one member and said other member, means connecting the intermediate of said coaxially disposed members with said tool, raising means connected with said intermediate member, and means responsive to the movement of said intermediate member and cooperating with said two interlocking means for connecting and disconnecting the intermediate member and the other two movable members and controlling said two interlocking means connecting and disconnecting said other two movable members and said stationary members, respectively.

19. An agricultural implement comprising frame means, tool means movable between two positions, spring means, means releasably connecting said spring means with said tool means so as to hold said tool means in one position, means for disconnecting said spring means from said tool means and connecting it with said frame means, and means for shifting said tool means when the spring means is disconnected therefrom.

20. In an agricultural implement, having soil working means to be lifted and lowered, the combination with a power lift device of the type that is adapted to drive in both directions and to operate through a given range of movement, of a lifting arm connected with said device to be actuated in the lowering direction through a given range, a stationary part, a member connected with said soil working means, means for releasably engaging said member with said lifting arm for a portion of the range of movement of the latter, and means responsive to movement of said member through said portion of said range of movement for engaging said member with said stationary part and disengaging said member from said lifting arm so as to provide for a completion of the movement of said arm through its range.

21. The invention set forth in claim 20, further characterized by said first member comprising two separate parts movable relative to one another but both connected to move with said soil working means.

22. In a grain drill having seed furrow openers movable into and out of soil working position and spring means through which force may be applied to hold said furrow openers in said position, a member connected to act through said spring means for transmitting force to said openers to hold them in soil working position, loading spring means connected with said member so as to transmit force therethrough and through said spring means to said openers, and lift means connected with said member for raising said openers against said loading spring means and aided initially therein by the force stored in said first mentioned spring means.

23. The invention set forth in claim 22, further characterized by mechanism for disconnecting said loading spring means from said member after the latter has been moved by said lift means in the lifting direction.

24. A mechanical movement comprising a first part adapted to be moved and to have force applied thereto to shift said part, the latter having a recess, a second part disposed adjacent said first part and having a recess, and a third part adapted to be disposed between said first and second parts and having oppositely disposed projections adapted to enter said recesses, respectively, the distance between said first and second parts being substantially equal to the length of said third part and one only of said projections, whereby when one of the projections on said third part is disposed in the recess in said first part said third part is adapted to be moved with said first part, when the latter is moved, until said third part reaches a position to enter the recess in said second part, whereupon said third part becomes disconnected from said first part.

25. The invention set forth in claim 24 further characterized by recesses being out of registry in one position of said shiftable part relative to said second part, whereby said third part is held in the recess of said first part until the latter and said third part are shifted into a position where said third part is free to move into the recess of said second part and out of the recess of said first part.

26. A mechanical movement comprising a shaft, a pair of members receiving said shaft and disposed in spaced apart relation axially of said shaft, one of said members being stationary and said shaft being rockable relative thereto and the other member being fixed to said shaft whereby said other member and said shaft move together, a third member rockably and shiftably mounted on said shaft between the members of said pair of members, means for holding said pair of members against axially outward displacement, and a pair of cooperating engageable and disengageable projection and notch means formed on each member of said pair of members and the adjacent portions of said third member, said two projection and notch means being so constructed and arranged that the distance between said pair of members is appreciably no greater than the axial distance of said third member and one of said projection and notch means, whereby one of said projection and notch means connects said third member with one of said pair of members only when said third member is disengaged from the other of said pair of members, and vice versa.

27. A mechanical movement comprising a shaft, a pair of members receiving said shaft and disposed in spaced apart relation axially of said shaft, one of said members being stationary and said shaft being rockable relative thereto and the other member being fixed to said shaft whereby said other member and said shaft move together, a third member rockably mounted on said shaft between the members of said pair of members, biasing means acting against said third member, and a pair of cooperating engageable and disengageable projection and notch means formed on each member of said pair of members and the adjacent portions of said third member, the projection and notch means at one side of said third member being angularly spaced relative to the other projection and notch means and each of said projection and notch means having flaring side walls, whereby said biasing means acts against said third member to cause the latter to become disengaged from one of said pair of members and engaged with the other, according to the position of said other member and said shaft to which said other member is fixed.

28. A mechanical movement comprising a pair of relatively movable members disposed in spaced apart relation and each having a recessed section on the inner side thereof, said recessed sections facing one another, a third member disposed in the space between said relatively movable members, and yielding means connected with said third member and opposing movement thereof in one direction, said third member carrying means engageable in one or the other of said recessed sections, said last mentioned means and said recessed sections having angled cooperating walls arranged so that movement of one of said movable members in said one direction carries said third member with it against the action of said yielding means until the recess-engaging means on said third member is in a position to enter the recessed section of the other of said movable members, whereby said third member may be interlocked with either one or the other of said relatively movable members and disengaged from said other or said one of said relatively movable members.

29. A mechanical movement comprising a pair of relatively movable members disposed in spaced apart relation and each having a recessed section on the inner side thereof, said recessed sections facing one another, a third member disposed in the space between said relatively movable members and carrying means that is laterally shiftable toward and away from one or the other of said first mentioned members and, when shifted, engageable in one or the other of said recessed sections, the engaging wall portions of said shiftable means and said recessed sections being relatively angled, and spring means acting against said third member so as to yieldingly oppose movement thereof in one direction, whereby movement of one of said pair of members in said one direction carries with it said third member until the laterally shiftable means thereof moves into a position to enter and does enter the recessed section of the other of said pair of members, thereby releasing the latter member and said third member.

JOHN H. STARR.

REFERENCES CITED

The following references are of record in the file of this patent:

UNITED STATES PATENTS

| Number | Name | Date |
|---|---|---|
| 964,761 | Davis | July 19, 1910 |
| 1,222,299 | Kardell | Apr. 10, 1917 |
| 1,378,432 | Towle | May 17, 1921 |
| 1,462,022 | Neher | July 17, 1923 |
| 1,825,719 | Einstein | Oct. 6, 1931 |
| 2,170,171 | Wemp | Aug. 22, 1939 |
| 2,265,260 | Argo | Dec. 9, 1941 |
| 2,273,068 | Ross et al. | Feb. 17, 1942 |
| 2,301,484 | Wahlberg | Nov. 10, 1942 |
| 2,366,122 | Merce | Dec. 26, 1944 |

FOREIGN PATENTS

| Number | Country | Date |
|---|---|---|
| 308,847 | Great Britain | Apr. 4, 1929 |